(12) United States Patent
West et al.

(10) Patent No.: US 10,554,720 B1
(45) Date of Patent: **\*Feb. 4, 2020**

(54) SELECTING ROUTES THROUGH A NETWORK

(71) Applicant: Fuze, Inc., Boston, MA (US)

(72) Inventors: Julian Wray West, North Hampton, NH (US); Jason Paul Jeffords, Bedford, NH (US); Darryl Dietz, Rye, NH (US); Rajesh K. Mishra, Westford, MA (US)

(73) Assignee: FUZE, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,098

(22) Filed: Sep. 11, 2018

Related U.S. Application Data

(63) Continuation of application No. 11/751,391, filed on May 21, 2007, now Pat. No. 10,097,612.

(60) Provisional application No. 60/844,030, filed on Sep. 12, 2006, provisional application No. 60/809,063, filed on May 26, 2006.

(51) Int. Cl.
*H04L 29/06* (2006.01)
*H04L 29/12* (2006.01)

(52) U.S. Cl.
CPC ........ *H04L 65/80* (2013.01); *H04L 29/12783* (2013.01); *H04L 61/35* (2013.01)

(58) Field of Classification Search
None
See application file for complete search history.

(56) References Cited

U.S. PATENT DOCUMENTS

| 4,354,062 A | 10/1982 | Mussman |
| 4,656,366 A | 4/1987 | Davis et al. |
| 4,763,317 A | 8/1988 | Lehman et al. |
| 4,905,233 A * | 2/1990 | Cain ...................... H04L 45/00 370/237 |
| 5,796,795 A | 8/1998 | Mussman et al. |
| 6,104,711 A | 8/2000 | Voit |
| 6,154,463 A | 11/2000 | Aggarwal et al. |
| 6,188,687 B1 | 2/2001 | Mussman et al. |

(Continued)

FOREIGN PATENT DOCUMENTS

| EP | 1335525 | 8/2003 |
| KR | 2003-0023898 | 3/2003 |

(Continued)

OTHER PUBLICATIONS

Action and Response History in U.S. Appl. No. 11/751,355.

(Continued)

*Primary Examiner* — William J. Goodchild
(74) *Attorney, Agent, or Firm* — McDermott Will & Emery LLP

(57) ABSTRACT

Routing a communication from a first computer system, through a network, to a second computer system, may include determining whether a route through the network meets a metric, and assigning an output address of the first computer system and an input address of the second computer system based on whether the route meets the metric. The communication may be sent from the output address of the first computer system and received at the input address of the second computer system.

20 Claims, 7 Drawing Sheets

(56) References Cited

U.S. PATENT DOCUMENTS

| | | |
|---|---|---|
| 6,243,388 B1 | 6/2001 | Mussman et al. |
| 6,282,574 B1 | 8/2001 | Voit |
| 6,684,247 B1 | 1/2004 | Santos et al. |
| 6,763,380 B1 | 7/2004 | Mayton et al. |
| 6,795,858 B1 | 9/2004 | Jain et al. |
| 6,804,712 B1 | 10/2004 | Kracht |
| 7,075,922 B2 | 7/2006 | Mussman et al. |
| 7,215,643 B2 | 5/2007 | Mussman et al. |
| 7,339,934 B2 | 3/2008 | Mussman et al. |
| 7,346,043 B1 | 3/2008 | Olshansky et al. |
| 7,363,381 B2 | 4/2008 | Mussman et al. |
| 7,379,471 B2 | 5/2008 | Mitsumori et al. |
| 7,388,946 B1 | 6/2008 | Mussman et al. |
| 8,457,000 B2 | 6/2013 | West et al. |
| 8,913,506 B2 | 12/2014 | West et al. |
| 2001/0012357 A1* | 8/2001 | Mirashrafi .............. H04L 29/06 379/387.01 |
| 2002/0012363 A1 | 1/2002 | Beidas et al. |
| 2002/0080790 A1* | 6/2002 | Beshai ................. H04L 45/302 370/392 |
| 2002/0095493 A1* | 7/2002 | Byrnes ................... H04L 45/02 709/224 |
| 2002/0159440 A1 | 10/2002 | Mussman et al. |
| 2002/0160811 A1* | 10/2002 | Jannette ................. H04L 47/10 455/560 |
| 2003/0012178 A1* | 1/2003 | Mussman ......... H04L 29/06027 370/352 |
| 2003/0088698 A1 | 5/2003 | Singh et al. |
| 2003/0091165 A1 | 5/2003 | Bearden et al. |
| 2003/0142633 A1* | 7/2003 | Wall ....................... H04L 12/56 370/254 |
| 2003/0204619 A1 | 10/2003 | Bays |
| 2004/0120502 A1* | 6/2004 | Strathmeyer ........... H04M 3/51 379/265.01 |
| 2004/0139209 A1 | 7/2004 | Mussman et al. |
| 2005/0025043 A1 | 2/2005 | Mussman et al. |
| 2005/0025123 A1 | 2/2005 | Mitsumori et al. |
| 2005/0102414 A1* | 5/2005 | Hares ..................... H04L 45/00 709/232 |
| 2005/0117562 A1 | 6/2005 | Wrenn |
| 2005/0189401 A1 | 9/2005 | Butzer et al. |
| 2005/0243725 A1 | 11/2005 | Wrenn et al. |
| 2005/0243816 A1 | 11/2005 | Wrenn et al. |
| 2005/0243817 A1* | 11/2005 | Wrenn ................... H04L 45/00 370/389 |
| 2005/0243830 A1 | 11/2005 | Wrenn et al. |
| 2006/0031519 A1 | 2/2006 | Helliwell et al. |
| 2006/0209701 A1 | 9/2006 | Zhang et al. |
| 2006/0274733 A1 | 12/2006 | Mussman et al. |
| 2007/0070976 A1 | 3/2007 | Mussman et al. |
| 2007/0133567 A1 | 6/2007 | West et al. |
| 2007/0143449 A1 | 6/2007 | West et al. |
| 2007/0165607 A1 | 7/2007 | Mussman et al. |
| 2007/0283042 A1 | 12/2007 | West et al. |
| 2007/0286361 A1 | 12/2007 | West et al. |
| 2008/0019388 A1* | 1/2008 | Harmon .................. H04L 45/00 370/412 |
| 2008/0063149 A1 | 3/2008 | West et al. |
| 2008/0070528 A1 | 3/2008 | Joyner et al. |
| 2008/0112327 A1 | 5/2008 | Mussman et al. |
| 2013/0308760 A1 | 11/2013 | West et al. |

FOREIGN PATENT DOCUMENTS

| | | |
|---|---|---|
| WO | WO-2007/140164 | 12/2007 |
| WO | WO-2007/140165 | 12/2007 |

OTHER PUBLICATIONS

EP Communication in EP Patent Application No. 07797624.9 dated Mar. 22, 2010.
Extended Search Report in European Patent Application No. EP07797624.9 dated Nov. 24, 2009.
International Preliminary Report on Patentability in International Patent Application No. PCT/US2007/069375 dated Mar. 3, 2009.
International Preliminary Report on Patentability in International Patent Application No. PCT/US2007/069378 dated Nov. 27, 2008.
International Search Report and Written Opinion in International Patent Application No. PCT/US2007/069375 dated Jul. 17, 2008.
International Search Report and Written Opinion in International Patent Application No. PCT/US2007/069378 dated Jul. 3, 2008.
Machine Translation of Korean Patent Application No. 2003-0023898, Application published Mar. 2003.
Office Action in U.S. Appl. No. 11/751,355 dated Jan. 21, 2011.
Reply to EP Examination Report in EP Patent Application No. 07797624.9 dated Sep. 1, 2010.
Supplementary Search Report in European Patent Application No. 07797624 dated Nov. 9, 2009.
Varela et al., "Multi-service routing—a new QoS routing approach supporting differentiation", Telecommunications, 2005, Advanced Industrial Conference on Telecommunications/Service Assurance with Partial and Intermittent Resources Conference/E-Learning on Telecommunications Workshop, AICT/SAPIR/ELETE 2005, Proceedings of Jul. 17-20, 2005.

* cited by examiner

SELECTING ROUTES THROUGH A NETWORK

CROSS-REFERENCE TO RELATED APPLICATIONS

The present application claims the benefit of priority under 35 U.S.C. § 120 as a continuation from U.S. patent application Ser. No. 11/751,391, filed on May 21, 2007, which claims the benefit of, and priority to, U.S. Provisional Application No. 60/844,030 filed on Sep. 12, 2006 and the benefit of, and priority to, U.S. Provisional Application No. 60/809,063 filed on May 26, 2006. The contents of these applications are hereby incorporated by reference into this patent application as if set forth herein in full.

TECHNICAL FIELD

This patent application relates generally to selecting routes, or paths, through a network and, more particularly, to selecting routes: through the network to impact the quality of service (QoS) associated with communications, such as telephone calls, sent through the network.

BACKGROUND

Voice over Internet Protocol (VoIP) enables users to make telephone calls over a computer network, such as the Internet. VoIP is used to convert a voice signal front a telephone into a digital signal, which can be transmitted over the computer network. At a receiving end, VoIP is used to convert the digital signal back into a voice signal.

Problems can arise during transmission of telephone calls over a network. For example, excessive network traffic can create a bottleneck at a node on the network, thereby affecting the quality of the telephone call. Also, a node on the network can fail or function improperly; which can also have a deleterious effect on telephone calls transmitted through the network. These problems are not unique to telephone calls that are transmitted over a network using VoIP, but rather such problems can occur in any network over which telephone calls are routed.

The foregoing problems can occur in managed networks, in which a predefined bandwidth is guaranteed per telephone call, but are particularly acute in unmanaged networks, such as the Internet, where a predefined amount of bandwidth is not guaranteed per telephone call.

SUMMARY

This patent application describes methods and apparatus, including computer program products, for selecting routes through a network.

In general, this patent application describes a method for affecting routing of a communication from a first computer system, through a network, to a second computer system. The method comprises assigning an output address of the first computer system and an input address of the second computer system. The communication is sent from the output address of the first computer system and received at the input address of the second computer system. The method may also include one or more of the following features, either alone or in combination.

Assigning the output address of the first computer system and the input address of the second computer system may comprise generating a route list. The route list may comprise the output address of the first computer system and the input address of the second computer system. Furthermore, the route list may comprise one or more additional output addresses of the first computer system paired with one or more additional input addresses of the second computer system.

The method may comprise determining whether a route through the network meets a metric. The metric may be predefined or measured dynamically. The output address of the first computer system and the input address of the second computer system may be assigned based on whether the route meets the metric. If the route does not meet the metric, a new output address of the first computer system and a new input address of the second computer system may be assigned to thereby select a new route through the network. The communication may be sent from the new output address of the first computer system and received at the new input address of the second computer system. The metric may comprise plural metrics. The plural metrics may comprise an attribute of the route and a quality of communication. The attribute of the route may comprise at least one of a quality of the route and a bandwidth associated with the route.

The method may comprise assigning a second output address of the first computer system and a second input, address of the second computer system if there is not sufficient bandwidth associated with the mute to accommodate communication.

The network may comprise an unmanaged network, over which a predefined bandwidth is not guaranteed for communication. One example of an unmanaged network includes the Internet. The network may comprise a managed network, over which a predefined bandwidth is guaranteed for communication. The communication may comprise a telephone call and/or any other type of data transfer.

The first computer system may be configured to obtain the route list and to route the communication in accordance with the route list prior to engaging in a communication over the network. The first computer system may be configured to obtain the route list and to route the communication in accordance with the route list during a set-up process for engaging in communication over the network.

The foregoing method for affecting routing of a communication may be implemented using one or more machine-readable media. The one or more machine-readable media stores instructions that are executable by one or more processing devices to perform the method. The method may be implemented using one or more apparatus and/or systems that include one or more processing devices and memory for storing instructions that arc executable by one or more processing devices.

In general, this patent application also describes a system to affect routing of communication over a network. The system comprises a first computer system having plural output addresses, and a second computer system having plural input addresses. At least one of the first computer system and the second computer system is configured to assign an output address of the first computer system and an input address of the second computer system, through which addresses communication is routed, via the network, between the first computer system and the second computer system. The system may also include one or more of the following features, either alone or in combination.

At least one of the first computer system and the second computer system may be configured to generate a route list comprising the output address of the first computer system and an input address of the second computer system. The route list may comprise one or more additional output addresses of the first computer system paired with one or more additional input addresses of the second computer system, The system may comprise a registration server. The registration server may be configured to receive the route list and to send the route list to at least one of the first computer system and the second computer system. At least one of the first computer system and the second computer system may be configured to use the route list to determine the output address of the first computer system over which to output the communication to the network and to determine the input address of the second computer system to which to direct the communication.

At least one of the tint computer system and the second computer system may be configured to: determine whether a route through the network meets a metric, and assign the output address of the first computer system and the input address of the second computer system based on whether the route meets the metric. The metric may comprise plural metrics, such as a bandwidth associated with a route. The plural metrics may comprise an attribute (e.g., a quality) of the route and a quality of the communication. The system may comprise one or more servers configured to store information relating to the quality of communications transmitted over the route and to provide the information to at least one of the first computer system and the second computer system. The information corresponds to the metric used to assign the output address of the first computer system and the input address of the second computer system.

If the route does not meet the metric, at least one of the first computer system and the second computer system may be configured to assign a new output address of the first computer system and a new input address of the second computer system to thereby select a new route through the network. The communication may be sent from the new output address of the first computer system and received at the new input address of the second computer system. The route may be dictated, at least in part, by an initial output address of the first computer system and an initial input address of the second computer system.

The network may comprise an unmanaged network, over which a predefined bandwidth is not guaranteed for communication. One example of an unmanaged network is the Internet. The network may a managed network, over which a predefined bandwidth is guaranteed for communication. The communication may comprise a telephone call.

The first computer system may be configured to assign an output address of the first computer system and an input address of the second computer system, where the output address of the first computer system and the input address of the second computer system correspond to a route through the network. The second computer system may be configured to receive the route from the first computer system and to propose, to the first computer system, an alternate route through the network. The second computer system may be configured to receive the route from the first computer system, to determine whether the route is acceptable to the second computer system, and, if the route is not acceptable, to wait for an alternate route from the first computer system.

The second computer system may be configured to assign an output address of the first computer system and an input address of the second computer system, where the output address of the first computer system and the input address of the second computer system correspond to a route through the network. The first computer system may be configured to receive the mute from the second computer system and to propose, to the second computer system, an alternate route through the network. The first computer system may be configured to receive the route from the second computer system, to determine whether the route is acceptable to the first computer system, and, if the route is not acceptable, to wait for an alternate route from the second computer system.

The first computer system may be configured to assign a first output address of the first computer system and a first input address of the second computer system, where the first output address of the first computer system and the first input address of the second computer system correspond to a first route through the network. The second computer system may be configured to assign a second output address of the first computer system and a second input address of the second computer system, where the second output address of the first computer system and the second input address of the second computer system correspond to a second route through the network. At least one of the first computer system and the second computer system may be configured to determine whether to use, for communication, the first route, the second route, or neither route. If the first computer system determines that neither mute is to be used for communication, the first computer system may be configured to select a third computer system with which to communicate. If the second computer system determines that neither route is to be used for communication, the second computer system may be configured to select the third computer system with which to communicate.

In general, this patent application also describes a system to affect routing of communication over a network. The system comprises a first computer system that is that is configured to communicate over the network via one or more output addresses, a second computer system that is that is configured to communicate over the network via one or more input addresses, and a third computer system that is configured to communicate over the network. At least one of the first computer system, the second computer system, and the third computer system may be configured to assign an output address of the first computer system and an input address of the second computer system for communication between the first computer system and the second computer system. The output address of the first computer system and the input address of the second computer system correspond to a route through the network. The system may also include one or more of the following features, either alone or in combination.

The output address of the first: computer system and the input address of the second computer system may comprise parts of a route list. The route list may comprise pairs of addresses over which communications can be routed between the first computer system and the second computer system. If the first computer system is configured to assign the output address of the first computer system and the input address of the second computer system, the first computer system may be configured to provide the route list to at least one of the second computer system and the third computer system. If the second computer system is configured to assign the output address of the first computer system and the input address of the second computer system, the second computer system may be configured to provide the route list to at least one of the first computer system and the third computer system. If the third computer system is configured to assign the output address of the first computer system and the input address of the second computer system, the third computer system may be configured to provide the route list to at least one of the first computer system and the second computer system.

At least one of the first computer system, the second computer system, and the third computer system may be configured to: determine whether a route through the network meets a metric, and assign the output address of the first computer system and the input address of the second computer system based on whether the route meets the metric. The metric may relate to one or inure of jitter on the network, packet loss on the network, latency on the network, and bandwidth utilization on the network. In this regard, the metric may comprise one or more metrics that are obtained via one or more of the tint computer system, the second computer system, and the third computer system.

In a case that the first computer system assigns the output address of the first computer system and the input address of the second computer system, the metric may comprise one or more metrics that are determined by the first computer system. In a case that the second computer system assigns the output address of the first computer system and the input address of the second computer system, the metric may comprise one or more metrics that are determined by the second computer system. In a case that the third computer system assigns the output address of the first computer system and the input address of the second computer system, the metric may comprise one or more metrics that are determined by the third computer system.

In a case that the first computer system assigns the output address of the first computer system and the input address of the second computer system, the metric may comprise one or more metrics that are determined by at least one of the second computer system and the third computer system. in a case that the second computer system assigns the output address of the first computer system and the input address of the second computer system—the metric may comprise one or more Metrics that are determined by at least one of the first computer system and the third computer system. In a case that the third computer system assigns the output address of the first computer system and the input address of the second computer system, the metric may comprise one or more metrics that are determined by at least one of the first computer system and the second computer system.

At least one of the first computer system, the second computer system, and third computer system may be configured to generate a route list comprising the output address of the first computer system and an input address of the second computer system. The first computer system may be configured to obtain the route list and to route the communication in accordance with the route list prior to engaging in a communication over the network. The first computer system may be configured to obtain the route list and to route the communication in accordance with the route list during a set-up process for engaging in communication over the network. The route list may be obtained from one of the second computer system and the third computer system.

The details of one or more examples are set forth in the accompanying drawings and the description below. Further features, aspects, and advantages will become apparent from the description, the drawings, and the claims.

DESCRIPTION OF THE DRAWINGS

Like reference numerals in different figures indicate like elements.

DETAILED DESCRIPTION

The processes described herein are applicable to any communication through a network, including, but not limited to, telephone calls, information, video, interactive video, and audio/video. Implementations using telephone calls are described below. The concepts described with respect to telephone calls can be implemented for any data flow.

Figure 1:
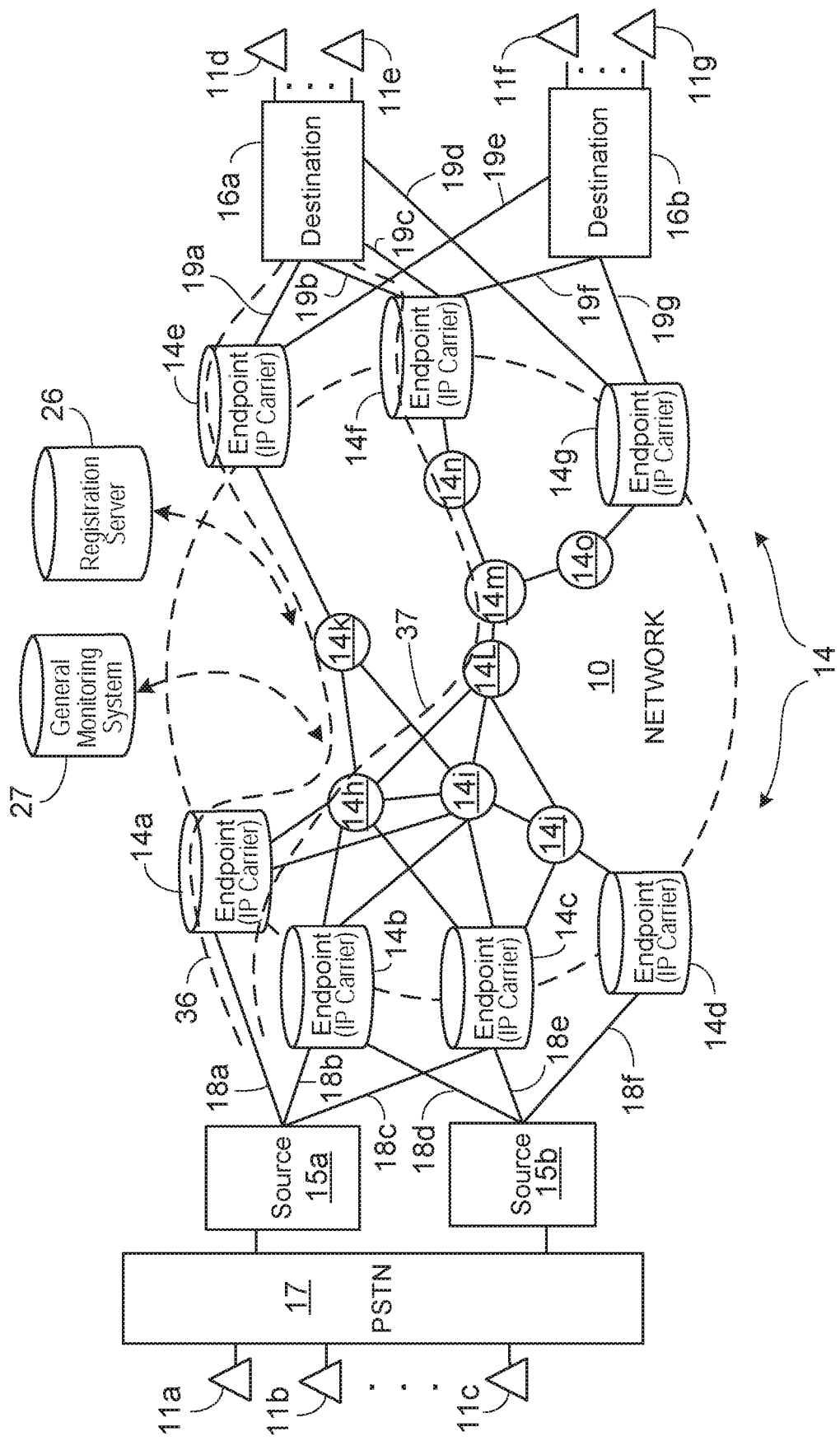
FIG. 1 is a block diagram of a network on which a process for selecting a route through the network may be implemented.

FIG. 1 shows a network 10, over which devices 11a to 11g, such as telephones, communicate. Devices 11a to 11g (which are hereinafter referred to as "communication devices") may be VoIP-enabled or non-VoIP-enabled. For example, the communication devices may be standard telephones, cellular telephones, VoIP-enabled telephones, or any combination thereof. The communication devices may also include processing devices, such as computers or any other data processing apparatus including, but not limited to, desktop or laptop computers, personal digital assistants (PDAs), and gaming devices.

Network 10 may be an IP-enabled network, and may include a local area network (LAN), such as an intranet, and/or a wide area network (WAN), which may, or may not, include the Internet. Network 10 may be wired, wireless, or a combination of the two. Network 10 may also include managed or/or unmanaged networks (where the Internet is one example of an unmanaged network). As explained above, in a managed network, a predefined bandwidth may be guaranteed per call, whereas in an unmanaged network, there is generally no per-call guaranteed bandwidth. For example, in the event of a failure or congestion on a managed network, a network administrator may re-route telephone calls so that each call receives the guaranteed bandwidth. This does not generally occur in unmanaged networks.

For the purposes of this description, network 10 can be conceptualized as a set of nodes, such as nodes 14. Endpoint nodes 14a to 14g may be IP carrier systems.

Examples of IF carrier systems include servers, networks, and/or other corrupters that are maintained by VoIP or other services providers such as, but not limited to, providers such as Verizon® and Comcast®. Generally speaking, the IP carrier systems are not specific to VoIP, but are general network providers, which are capable of receiving and transmitting data, including, but not limited to, communications including information, voice; video, audio, and the like. In some implementations, these systems receive telephone calls, i.e., data therefor, and route that data through other nodes of the network to its intended destination. These other nodes 14h to 14o may include, e.g., intermediary devices, computer, servers, and/or other networks, for routing data between a sourest and a destination. Examples of intermediary devices include, but are not limited to, routers, switches, gateways, or the like. Exemplary routes, or paths, through network 10 are depicted using straight lines. Other routes may also be included, and there may be devices that are not shown in the path of each depicted route.

In this regard, the terms "route" and "path" may be used interchangeably to denote a way through the network, which may or may not include specific devices, addresses, etc. Furthermore, the term "network", although singular, may refer to one or more communications networks in combination, such as those noted above.

In this context, the "source" of a telephone call is not the telephone on which the call was placed but rather a computer system that transmits the call to network 10. Likewise, the "destination" of a telephone call is not the telephone on which the call is answered, but rather a computer system that interfaces to network 10 to receive the call. Furthermore, keeping the foregoing in mind, a source constitutes an origination of a communication flow, and a destination constitutes the endpoint of the communication flow. It is noted that the terms "source" and "destination" are relative, meaning that any computer (or other communication) system may be a source or a destination based on whether that system is the origination point or endpoint of a flow.

The sources 15a, 15b and destinations 16a, 16b of a telephone call may be identical in structure and function, or at least have certain structure and functionality in common. Alternatively, a source and destination may have different structures and functions. For example, in some implementations, the source of a telephone call may be a computer system, such as that provided by Sonus®, Tekelec®, or Cedar Point®. Those computer systems generally include at least one computer that is capable of transmitting a telephone call from, e.g., the public switched telephone network (PSTN) 17 to network 10. In general, such telephone systems store a route list that includes source/destinations pairs, including one or more source/destination addresses for a telephone call. For example, source 15a may include one or more output addresses (e.g., IP addresses) through which source 15a sends telephone calls to network 10. These addresses may be addresses corresponding to different IP carriers (e.g., Comcast® and Verizon®) or different addresses for the same IP carrier (e.g., Comcast®). A route list for a source, e.g., 15a, may include a list of those addresses along with one or more associated destination addresses (e.g., for a destination 16a) to which a call is to be directed, as described below. Addresses on the mute list, at least in part, dictate a specific route through network. Sources 15a, 15b may be part of the same telephone system or different telephone systems. The same is true for destinations 16a, 16b.

A destination may be a computer system that interfaces to the internal telephone network of a company, e.g., to route telephone calls to telephones within that company. It may also have a connection to the PSTN (not shown). Each destination may include one or more input addresses (e.g., IP addresses), such as 19a to 19g, through which the destination receives telephone calls from a source over network 10. As above, these addresses may be addresses corresponding to different IP carriers (e.g., Comcast® and Verizon®) or different addresses for the same IP carrier (e.g., Comcast®).

Thus, the systems that may be used to perform the route selection process described herein may be two PSTN-connected gateways, such as: 15a, 15b or two independent gateways, such as 16a, 16b. Alternatively, a gateway (or other type of processing device) that is configured to perform the route selection process described herein may be between 15a, 15b or 16a, 16b or among network nodes 14. It is noted that central monitoring system 27 and/or registration server 26 (described below) may also be used to perform the route selection process described herein, and to provide routes to source(s) and/or destination(s) in the manner described herein.

Figure 2:
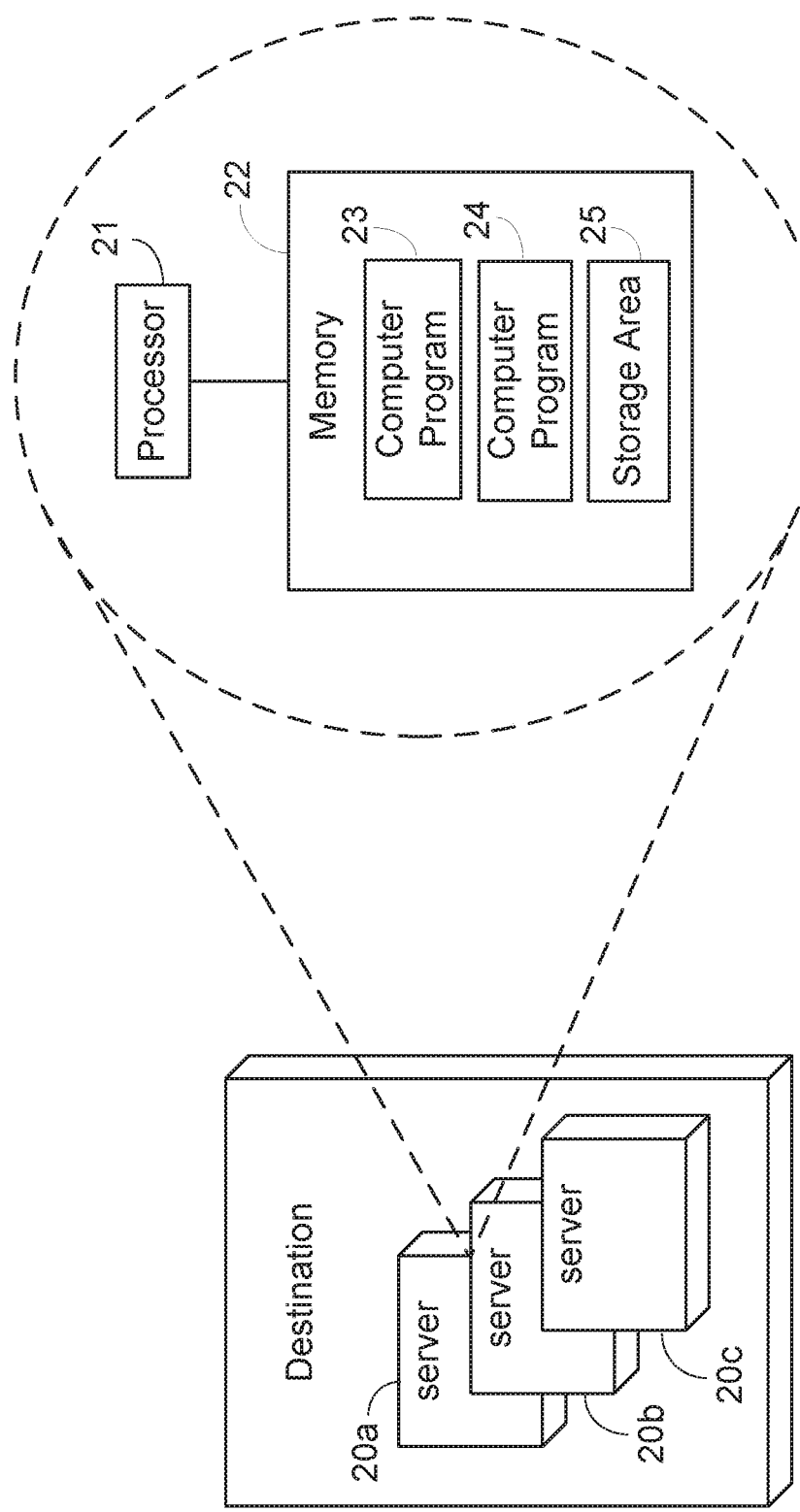
FIG. 2 is a block diagram of a telephone system on the network of FIG. 1.

Referring to FIG. 2, in this implementation, each destination may include one server 20a or multiple servers 20a to 20c (servers 20b and 20c are depicted using dashed lines to indicate that they are optional). Servers 20a to 20c may act together to perform some implementations of the various functions described herein. In other implementations, a single server may perform all of the server functions. In the case of multiple servers, server 20a may act as a controller or "load balancer" for the remaining servers 20b and 20c. In this role, server 20a may route data, requests, and instructions among network 10, a. client (e.g., a VoIP communication device), and a subordinate device, such as server 20b. Server 20a may store information locally, then route data to another device, such as server 20b. For the purposes of the following, such internal communications between server 20a and any subordinate devices will be assumed. It is noted that each source and/or third party computer system on the network may, or may not, have the same hardware/software configuration as in FIG. 2.

Each server may be any type of processing device that is capable of receiving and storing data, and of communicating with network 10 and VoIP clients. As shown in FIG. 2, server 20a includes one or more processor(s) 21 and memory 22 that stores computer programs that are executed by processor(s) 21. Memory 22 stores a computer program 23 for communicating with other devices using, e.g., session initiation protocol (SIP). Memory 22 also contains one or more computer programs 24 for participating in the route selection process described herein, and one or more data storage areas 25.

Only two sources 15a, 15b and two destinations 16a, 16b 8.11%, shown in FIG. 1. The route selection process described herein will work with any number of sources and destinations, and is not limited in any way by the configuration of FIG. 1.

A registration server 26 may be used in the route selection process. Registration server 26 may include one server or multiple servers, as described above with respect to the destination. The registration server communicates with both sources 15a, 15b and destinations 16a, 16b. Communication may be over network 10, over another network, direct, or a combination thereof. Registration server 26 obtains, stores, and provides the output addresses 18a to 18f of sources 15a, 15b and the input addresses 19a to 19g of destinations 16a, 16b. Each source or destination may provide input and/or output addresses to registration server 26 upon entry into the network, periodically, or in response to one or mom events, such as a configuration change or a failure or fault in one of its inputs/outputs. Furthermore, upon entering network 10, a source or destination may communicate with registration server 26 in order to obtain the addresses of other sources and/or destinations on the network in order to assign routes, as described below. In some implementations, registration server 26 may not be required (see below). Furthermore, in some implementations, registration server 26 may be statically configured with source/destination pairs or some subset thereof. That is, a network administrator may pre-program this information into registration server 26.

A central monitoring system 27, which may be comprised of one or more servers (e.g, as is also the case for registration server), may be used to obtain quality of service (QoS) information regarding telephone calls transmitted over network 10. Briefly, the central monitoring system receives the QoS information from the various endpoints (or other devices) on network 10 and provide that information to the sources, destinations, and/or third party computer systems used to select routes through the network. The sources, destinations and/or third party computer systems may use that information as a metric in determining route lists. In this regard, a third party computer system may include any computer system that is not a source or a destination, such as registration server 26 and/or the central monitoring system itself.

Communication between the sources and destinations and the central monitoring system may be over network 10, over another network, direct (e.g., a. wired or wireless connection), or a combination thereof. A more detailed description of the operation of the central monitoring system is provided below with respect to FIGS. 4 to 6.

FIG. 1 shows a single device operating as the central monitoring system. The central monitoring system, however, may be implemented using peer-to-peer software. That is, each source and/or destination or other device (or some subset thereof) may perform a portion (or all of the functions that are attributed herein to the central monitoring system. The information may then be exchanged among those peers and used as described herein. The same is true for the functionality attributed to registration server 26. That is, the registration server functions may be distributed among peers connected to network 10, thereby eliminating the need for a separate registration server. In alternative implementations, a separate central monitoring system and a separate registration server may coexist on the network along with peer-to-peer monitoring and registrations functions. In this case, the separate servers may augment the peer-to-peer functionality, or vice versa. It is noted that any two or more of the entities shown in FIG. 1 (e.g., the registration server and the central monitoring system) may be implemented in a single device, in multiple devices, in a source, in a destination, and/or functionality thereof may be distributed across multiple devices, including source(s) and/or destination(s).

Figure 3:
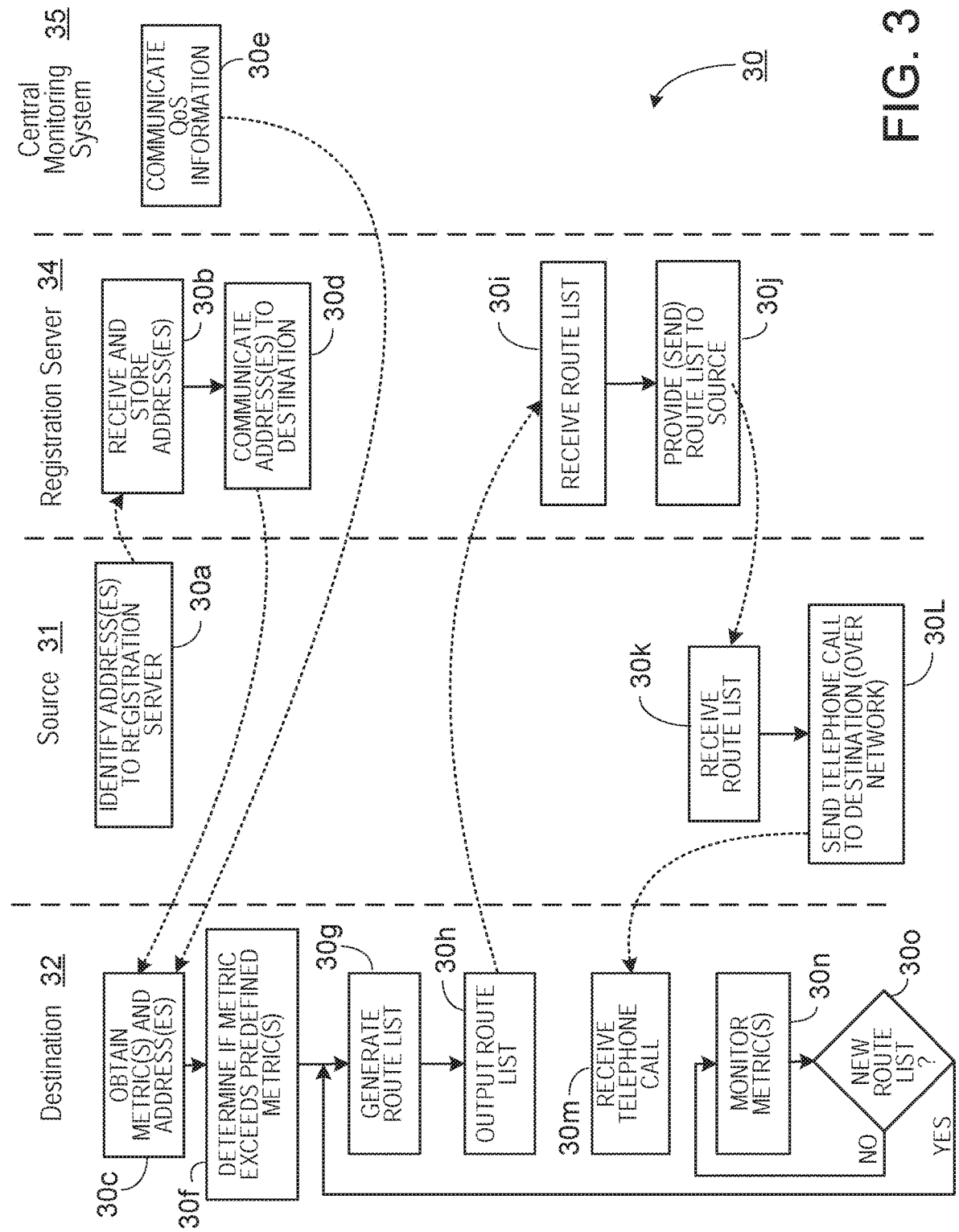
FIG. 3 is a flowchart showing a process for selecting a route through a network.

FIG. 3 shows a process 30 for selecting routes through network 10 by assigning source output addresses and destination input addresses. FIG. 3. is broken-down into four parts, part 31 for source functions, part 32 for destination functions, part 34 for registration server functions, and part 35 for central monitoring system functions. It is noted that the functions performed by two or more of these parts may be performed by a single device or system. Likewise, multiple devices or systems may be used to perform the functions shown in a single pan of FIG. 3. Also, the implementation shown in FIG. 3 includes a destination generating route list(s). However, in other implementations, which are described below, a source or third party computer system may generate the route list(s) and provide the route list(s) to other entities on the network.

According to process 30, sources 15*a*,15*b* identify (30*a*) (e.g., provide) their network (e.g., IP) addresses to registration server 26. For example, registration server 26 may be configured to discover at least one address of each source and request their other addresses, e.g., through a request/response protocol. Registration server 26 receives (30*b*) the sources' network addresses and stores them in memory. Destinations 16*a*, 16*b* may also identify (e.g., provide) their network (e.g., IP) addresses to registration server 26. As above, registration server 26 may be configured to discover at least one address of each destination and request their other addresses, e.g., through a request/response protocol. Registration server 26 receives the destination network addresses and stores them.

A destination 16*a* obtains (30*c*) the addresses of sources 15*a*, 15*b* and uses them to determine a route list, as described below. For example, destination 16*a* may request the source addresses from registration server 26, which may communicate (30*d*) the source addresses in response. Destination 16*a* may also request, and receive; destination addresses from registration server 26. However, in this example, destination 16*a* knows its own available input addresses and, therefore, need not request that information from registration server 26.

Destination 16*a* also obtains (30*c*) metrics, which may include attributes associated with routes (e.g., 36, 37) through network 10 and QoS associated with previous telephone calls that were transmitted through the source and destination addresses. The attributes associated with the routes may include a quality of the route, and/or whether there are any interruptions (e.g., outages) affecting the route. For example, the attributes (e.g., the metrics) may include one or more of jitter on the network, packet loss on the network, congestion on the network, latency on the network, and bandwidth utilization on the network.

The attributes associated with the route may be obtained using a traceroute or by any other method described herein or elsewhere. Generally speaking, a traceroute identifies a path that data packets for the call take through network 10 and the amount of time it took to arrive at each node (i.e., hop) of the network. The traceroute may be implemented by sending a "ping" to each hop on the network. The QoS associated with previous telephone calls and routes may be obtained from the central monitoring system. For example, the central monitoring system may receive a request for this information from the destination and communicate (30*e*) the information in response. In some implementations, the central monitoring system may not be used, and the metrics may be determined solely based on information gathered by the destination (or source).

Once destination 16*a* has obtained (30*c*) the metrics for one or more routes through network 10, destination 16*a* (or, more accurately, a computer program 24 running at destination 16*a*) determines (30*f*) if a route meets or exceeds predefined metric(s). For example, destination 16*a* may determine if the route has a latency or level of congestion that exceeds a predefined latency or level of congestion. Destination 16*a* may also determine if calls through the route have a less-than-acceptable QoS (e.g., less than a predefined QoS) or if the route contains an outage (e.g., a break in a communication link between nodes, or hops, of the network—as identified by the traceroute). One or more mathematical algorithms may be used by destination 16*a* when determining whether the route meets or exceeds the predefined metric(s). It is noted that different types of communication flows may use different algorithms and/or different metric(s). For example, voice, such as a telephone call, is typically real-time, which has latency and loss constraints. As a result; algorithms and metrics may be used that select routes that support real-time communication. Video typically requires a relatively high bit-rate. Accordingly, algorithms and metrics may be used that select routes that support relatively high bit-rates. On the other hand, data flows typically only require best effort data service. Therefore, in this case, algorithms and metrics may be used that select routes that have fewer constraints that those selected for voice or video.

Destination 16*a* generates (30*g*) a route list comprised of source/destination address pairs, which may be ordered based on how well each identified route through network 10 complies with the metrics obtained (30*c*) by the destination.

Taking source 15a as an example and latency as the key metric, destination 16a may determine that the route from output address 18a to its input address 19a has the least latency, that the route from output address 18a to its input address 19b has the second least latency, and that the route from output address 18b to its input address 19b has the third least latency, and so on. In this example, destination 16a generates a route list that gives top priority to the sot/we/ destination address 18a/19a, second priority to the source/ destination address 18a/19b, third priority to the source/ destination address 18b/19b, and so on. Destination 16a may, of course, take any other metrics, such as those noted above, into account when determining the route list. Destination 16a may also assign greater weight to one (or more) metric(s) relative to the others when generating a route list.

In some implementations, a path selection engine generates the route list. The path selection engine provides an ordered list of routes or paths that meet the requisite constraints for a particular communication flow. For example, the ordered list can indicate which routes (e.g., source/ destination pairs) are best and which are worst. The routes can be ordered from best to worst in the route list, if desired.

In another implementation, one or more metric(s) used to generate the route list may be administratively configured in the path selection engine (or in whatever process is used to generate the route list). That is, an administrator may program information such as weights, policies, and the like, which may be used in generating the route list. For example, a weight may indicate that a particular metric is to be given more importance (designated by its weight) than other(s) when generating the route list. A policy may indicate that a certain destination or IP carrier is preferred for a type of communication (e.g., for an international telephone call). A policy, such as this, maybe done on a cost basis, e.g., to route international calls to the lowest-cost provider (e.g., a separate route list may be generated for international calls as part of the policy). Administratively configured metric(s) may be used alone, or in combination with the "measured" metrics described herein when determining the route list.

In this implementation, destination 16a outputs (30h) the route list to registration server 26, where it is received (30i). Alternatively, the destination can provide the route list directly to the source (or vice versa). Registration server 26 provides (30j) the route list to source 15a. This may be done using a request/response protocol or registration server may program source 15a with the new route list when the new route list is received. In any case, source 15a receives (30k) the route list and stores it in memory. Source 15a uses the route list when sending (30l) a telephone call to a destination. That is, source 15a receives a telephone call, e.g., from the PSTN, and sends that call (specifically, data packets for the call) to network 10 through its output address specified in the route list (e.g., the top priority route, assuming that it is available). Source 15a sends the call to the destination address specified in the route list that corresponds to the output address over which it sends the telephone call to network 10.

In this regard, prior to engaging in a communication (e.g., telephone call) over the network, source 15 may request and receive the route list, and thereafter route the communication in accordance with the route list. For example, the route list may be obtained on a periodic, e.g., hourly, daily, weekly, basis irrespective of whether a communication over the network is imminent. Alternatively, source 15 may request and receive the route list during a set-up process for engaging in communication over the network. For example, as described above, source 15a receives a telephone call, e.g., from the PSTN. At that point, source 15a may request the latest route list, e.g., from the destination or other computer system that currently has the latest route list.

Destination 16a receives (30m) the call on the destination address specified in the route list and forwards the call to an appropriate telephone (e.g., over a local area network (LAN) (not shown) at the site of destination 16a).

Destination 16a may continue to monitor (30n) metrics of various routes through network 10 and, if necessary (30o), update the route list accordingly. For example, if an existing route, e.g., a route 36 defined by addresses 18a/19a, no longer meets the predefine metric(s), destination 16a may reconfigure the route list so that route 36 has a lower priority, and so that another route 37 defined by addresses 18a/19b, which does meet the predefined metric(s) has a higher priority. The updated route list may be propagated to sources 15a, 15b on the network in the manner described above. If the route list does not require updating, source 15a may continue to route calls using the existing source and destination addresses as configured in a current route list.

As noted above, sources 15a, 15b may have structure and function that is identical to, or substantially identical to, the structure and function of destinations 16a, 16b. In this implementation, a separate registration server may not be necessary. For example, a source may obtain the addresses of destinations using a discovery process, through network or direct communication with the destination, and/or through communication with the registration server. For instance, a source 15a may use dynamic host configuration protocol (DHCP) to obtain the addresses 19a to 19g of destinations 16a, 16b. Since source 15a includes the functionality of a destination, i.e., the ability to build a route list, and since source 15a knows the input addresses of destinations 16a, 16b, source 15a may generate its own route list, and route telephone calls according to that route list. A destination (when acting as a source) performs the same functions.

Source 15a may monitor the metrics, such as route quality and call QoS, and adjust its route list in real-time, or close to real-time (e.g., on a per-call basis or a timed basis). Source 15a may also use the metrics to perform load balancing on outgoing calls dynamically. For example, source 15a may detect the bandwidth of a route through the network, either directly or indirectly. Knowing the size of data packets associated with a string of telephone calls (e.g., 88 kilobytes (KB), 30 KB, 160 KB), source 15a may then be able to determine the point at which a particular node will become congested. At this point, source 15a may send subsequent telephone calls from a different output address, thereby sending these subsequent telephone calls along a different route of the network.

It is noted that a destination may direct load balancing. For example, a destination may signal a source, either directly or through a functional intermediary such as the registration server, to indicate that a route to one of its input addresses is congested. In response, the source may perform load balancing in the manner described above to relieve the congestion on the destination's input address.

A source may select a route through network 10 based on a failure of a destination to respond to a call. That is, VoIP may be implemented using SIP. SIP requires that an entity receiving a call (the destination) provide a response indicating that the call has been received. In this case, if the destination does not provide the appropriate response within a predefined period of time, the source may re-route the telephone call, e.g., by sending it from a different output address to the same, or a different, input address of the destination. This information may be specified in a current route list stored on the source, or a new route list may be required if all routes in the current route list fail in this manner. For example, the source may send an initial communication along a first route (source/destination pair) specified in the route list. If that communication fails, the source may send the communication along the next route, in terms of priority, on the route list, and so on until a successful communication is achieved.

In still another implementation, which may not require a registration server, each source may be statically configured with the output addresses of each destination, or some subset thereof. This implementation may necessitate manual reconfiguration of the destination addresses if any of those addresses change over time.

Figure 7:
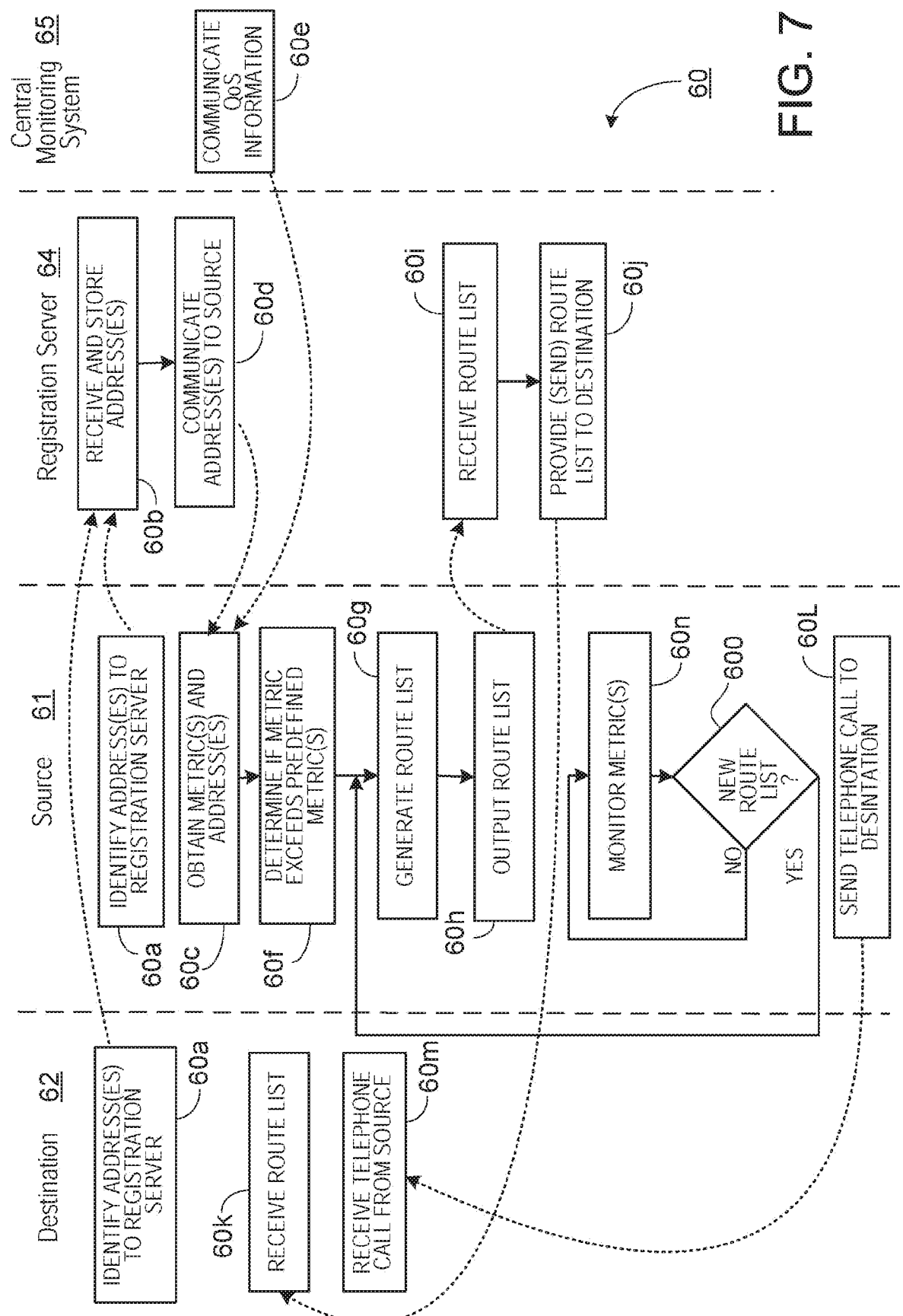
FIG. 7 is a flowchart showing an alternative process for selecting a route through a network.

FIG. 7 shows a process 60, which is performed by a source, such as source 15a, for selecting routes through network 10 by assigning source output addresses and destination input addresses. As was the case with FIG. 3, FIG. 7 is broken-down into four parts, part 61 for source functions, part 62 for destination functions, part 64 for registration server functions, and part 65 for central monitoring system functions. The functions performed by two or more of these parts may be performed by a single device or system. Likewise, multiple devices or systems may be used to perform the functions shown in a single part of FIG. 7.

According to process 60, sources 15a, 15b and destinations 16a, 16b identify (60a) (e.g., provide) their network (e.g., IP) addresses to registration server 26. This process is the same as described above with respect to FIG. 3. Registration server 26 receives (60b) the network addresses and stores them in memory. As above, registration server 26 may be configured to discover at least one address of each source and/or destination and request their other addresses, e.g., through a request/response protocol.

A source 15a obtains (60c) the addresses of destinations 16a, 16b and uses them to determine a route list. For example, source 15a may request the destination addresses from registration server 26, which may communicate (60d) the source addresses in response. Source 15a may also request, and receive, source addresses from registration server 26. However, in this example, source 15a knows its own available input addresses and, therefore, need not request that information from registration server 26.

Source 15a also obtains (60c) metrics, which may include attributes associated with routes (e.g., 36, 37) through network 10 and QoS associated with previous telephone calls that were transmitted through the source and destination addresses. The attributes associated with the routes may include a quality of the route, such as its latency and congestion, and/or whether there are any interruptions (e.g., outages) affecting the route. The attributes associated with the route may be obtained in the manner described above. The central monitoring system may receive a request for the attribute information from source 15a and communicate (60c) the information in response. As above, the central monitoring system may not be used, and the metrics may be determined solely based on information gathered by the source (or destination).

Once source 15a has obtained (60c) the metrics for one or more routes through network 10, source 15a (or, more accurately, a computer program running at source 15a) determines (60f) if a route meets or exceeds predefined metric(s). For example, source 15a may determine if the route has a latency or level of congestion that exceeds a predefined latency or level of congestion. Source 15a may also determine if calls through the route have a less-than-acceptable QoS (e.g., less than a predefined QoS) or if the route contains an outage (e.g., a break in a communication link between nodes, or hops, of the network—as identified by the traceroute). As explained above, one or more mathematical algorithms may be used by source 15a when determining whether the route meets or exceeds the predefined metric(s). The same algorithms may be used here.

Source 15a generates (60g) a route list comprised of source/destination address pairs, which may be ordered based on how well each identified route through network 10 complies with the metrics obtained (60c) by the source. As above, taking destination 16a as an example and latency as the key metric, source 15a may determine that the route from output address 18a to input address 19a has the least latency, that the route from output address 18a to its input address 19b has the second least latency, and that the route from output address 18b to its input address 19b has the third least latency, and so on. In this example, source 15a generates a route list that gives top priority to the source/destination address 18a/19a, second priority to the source/destination address 18a/19b, third priority to the source/destination address 18b/19b, and so on. Source 15a may, of course, take any other metrics, such as those noted above, into account when determining the route list. Source 15a may also assign greater weight to one (or more) metric(s) relative to the others when generating a route list.

In some implementations, a path selection engine generates the route list. The path selection engine may be the same engine as described above in process 30. As was also the case above in process 30, one or more metric(s) used to generate the route list may be administratively configured in the path selection engine (or in whatever process is used to generate the route list). That is, an administrator may program information such as weights, policies, and the like, which may be used in generating the route list. For example, a weight may indicate that a particular metric is to be given more importance (designated by its weight) than other(s) when generating the route list. A policy may indicate that a certain destination or IP carrier is preferred for a type of communication (e.g., for an international telephone call). A policy, such as this, may be done on a cost basis, e.g., to route international calls to the lowest-cost provider (e.g., a separate route list may be generated for international calls as part of the policy). Administratively configured metric(s) may be used alone, or in combination with the "measured" metrics described herein when determining the route list.

In this implementation, source 15a outputs (60h) the route list to registration server 26, where it is received (60i). Registration server 26 provides (60j) the route list to destination 16a. This may be done using a request/response protocol or registration server may program destination 16a with the new route list when the new route list is received. In any case, destination 16a receives (60k) the route list and stores it in memory. Destination 16a uses the route list when receiving communication. That is, source 15a receives a telephone call, e.g., front the PSTN, and sends (60l) that call (specifically, data packets for the call) to network 10 through its output address specified in the route list (e.g., the top priority route, assuming that it is available). Source 15a sends the call to the destination address specified in the route list that corresponds to the output address over which it sends the telephone call to network 10.

Destination 16a receives (60m) the call on the destination address specified in the route list, and forwards the call to an appropriate telephone (e.g., over a local area network (LAN) (not shown) at the site of destination 16a).

Source 15a may continue to monitor (60n) metrics of various routes through network 10 and, if necessary (60o), update the route list accordingly. As in the example above, if an existing route, e.g., a route 36 defined by addresses 18a/19a, no longer meets the predefine metric(s), destination 16a may reconfigure the route list so that route 36 has a lower priority, and so that another route 37 defined by addresses 18a/19b, which does meet the predefined metric(s) has a higher priority. The updated route list may be propagated to destinations 16a, 16b on the network in the manner described above. If the route list does not require updating, source 15a may continue to route calls using the existing source and destination addresses as configured in a current route list.

In other implementations, the actions associated with generating a route list may be performed by a third party computer system, e.g., a computer system that is neither a source nor a destination. For example, the route list may be generated by registration server 26, central monitoring system 27, or a combination thereof. In another example, the route list may be generated by one or more of the nodes 14 on network 10. The actions associated with generating the route list by a third party are essentially the same as those shown for the destination in FIG. 3 and the source in FIG. 7. In the case of a third party system generating the route list, the route list is provided from the third party system to the source(s) and/or destination(s), as appropriate.

To summarize, in a case where a destination generates the route list, the destination provides the route list to other destinations, the sources, and/or any third party computer systems, or subset(s) thereof. In a case where a source generates the route list, the source provides the route list to other sources, the destinations, and/or any third party computer systems, or subset(s) thereof. In a case where a third party computer system generates the route list, the third party computer system provides the route list to the sources, the destinations, and/or any other third party computer systems, or subset(s) thereof. In some cases, an entity receiving a route list may be programmed to review the route list and to determine based, e.g., on one or more factors, whether the route list is acceptable to the entity. For example, a source that receives a route list may know that one of its output addresses specified in the route list is no longer valid, that a route in the list contains a fault, or that some routes have more congestion than others. The receiving entity may deem the route list to be unacceptable. Accordingly, the receiving entity may communicate, to whichever entity sent and/or generated the route list, that the route list is unacceptable. In this case, the receiving entity and the entity that sent and/or generated the route list may exchange communications to determine how to proceed.

In some implementations, the receiving entity may request and receive, from the entity that sent and/or generated the route list, a new route list that excludes any route(s) that the receiving entity has identified as problematic. In this example, each of the receiving entity and the entity that sent and/or generated the route list may be a source, a destination, or a third party system. The new route list may include one or more alternate routes between a source and a destination. During the exchange of communications, the receiving entity may request a new route list and wait for the new route list from the entity that sent and/or generated the route list. Alternatively, the receiving entity may propose one or more alternate routes, or an entire new route list, to the entity that sent and/or generated the route list. If it deems the alternate routes and/or new route list to be acceptable, the entity that sent and/or generated the route list may incorporate those one or more alternate routes into the route list (or substitute the new route list for the current route list), and distribute the resulting revised or up-to-date route list to any sources, destinations, and/or third party systems.

In some implementations, the receiving entity and the entity that sent and/or generated the route list may negotiate which routes to include in the route list. For example, a source and a destination may exchange routes, along with appropriate metrics, and make a joint decision as to which routes to include in the route list. For instance, if the source deems routes A, B and C to be acceptable, and the destination deems routes B, C and D to be acceptable, the two may agree to generate a route list including only routes B and C, i.e., the two routes that both deem to be acceptable. Any criteria, such as the metrics described above, may be used to determine acceptability of the routes. Third party computer systems may be part of the negotiation as well. For example, if a third party computer system deems routes B, E and F to be acceptable, the result of a three-party negotiation may be a route list with only route B.

In some implementations, two or three separate computer systems may each generate route lists independently of one another. For example, a source may generate a first route list in accordance with process 60. A destination may generate a second route list in accordance with process 30, and a third party system may generate a third route list. In this example, the source, destination and/or third party system may each decide whether to use the route list generated by the source, the route list generated by the destination, the route list generated by the third party system, or none of them. The decisions of the three entities may be based on the metrics described above and/or on other information that is available to those entities. The decision may be a common decision. That is, the three may communicate and decide together which route list to accept. Once a decision is made, the other route lists may be discarded or disregarded. The entity that generated the accepted route list may then be tasked to keep that route list up-to-date, and to distribute updated to other entities on the network, as required.

If the source, destination and/or third party system decide not to use any of the route lists that were generated, the source, destination and/or third party system may instead direct their communication to another entity on the network in order to obtain a different route list and/or other routing information, such as a table. The information that is obtained may then be distributed among the source, destination and/or third party system, and they may accept or not accept it as described above.

As explained above, the metrics that affect routing decisions include, but are not limited to, network QoS, jitter on the network, packet loss on the network, congestion on the network, latency on the network, and bandwidth utilization on the network. The metrics that affect generation of the route lists (e.g., in action 30c and 60c) may be local or remote. For example, if a destination is generating the route list, metrics may be obtained on the destination itself and/or the metrics may be obtained from another computer system, such as a source and/or the central monitoring system. Likewise, if a source is generating the route list, metrics may be obtained on the source itself and/or the metrics may be obtained from another computer system, such as a destination and/or the central monitoring system. The same is true if a third party system is generating the route list, i.e., the metrics may by local or obtained from a remote computer system.

In this regard, it is noted that processes 30 and 60 (and a corresponding process, which is not shown, for a third party system) may generate route lists irrespective of metrics. For example, a source, destination and/or third party system may generate a route list by combining source/destination address pairs regardless of the characteristics of the routes between those source/destination address pairs. Route lists generated in this manner may be processes and distributed in the same manner as described above. For example, a source, destination and/or third party system may negotiate the contents of a route list and distribute a commonly-accepted route list among entities on the network.

Figure 4:
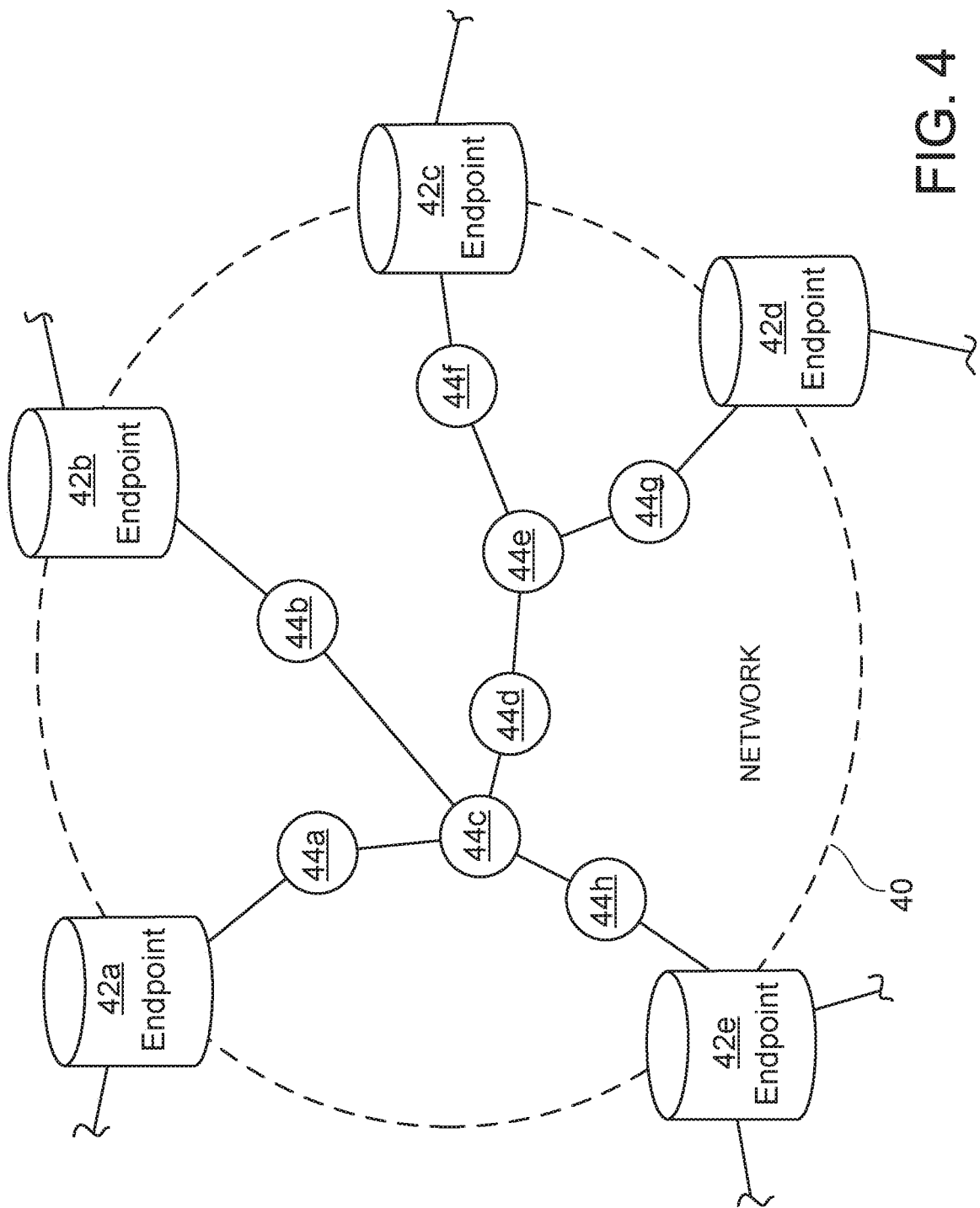
FIG. 4 is a block diagram of a network on which a process for monitoring the quality of a telephone call transmitted over a network may be implemented.
Figure 5:
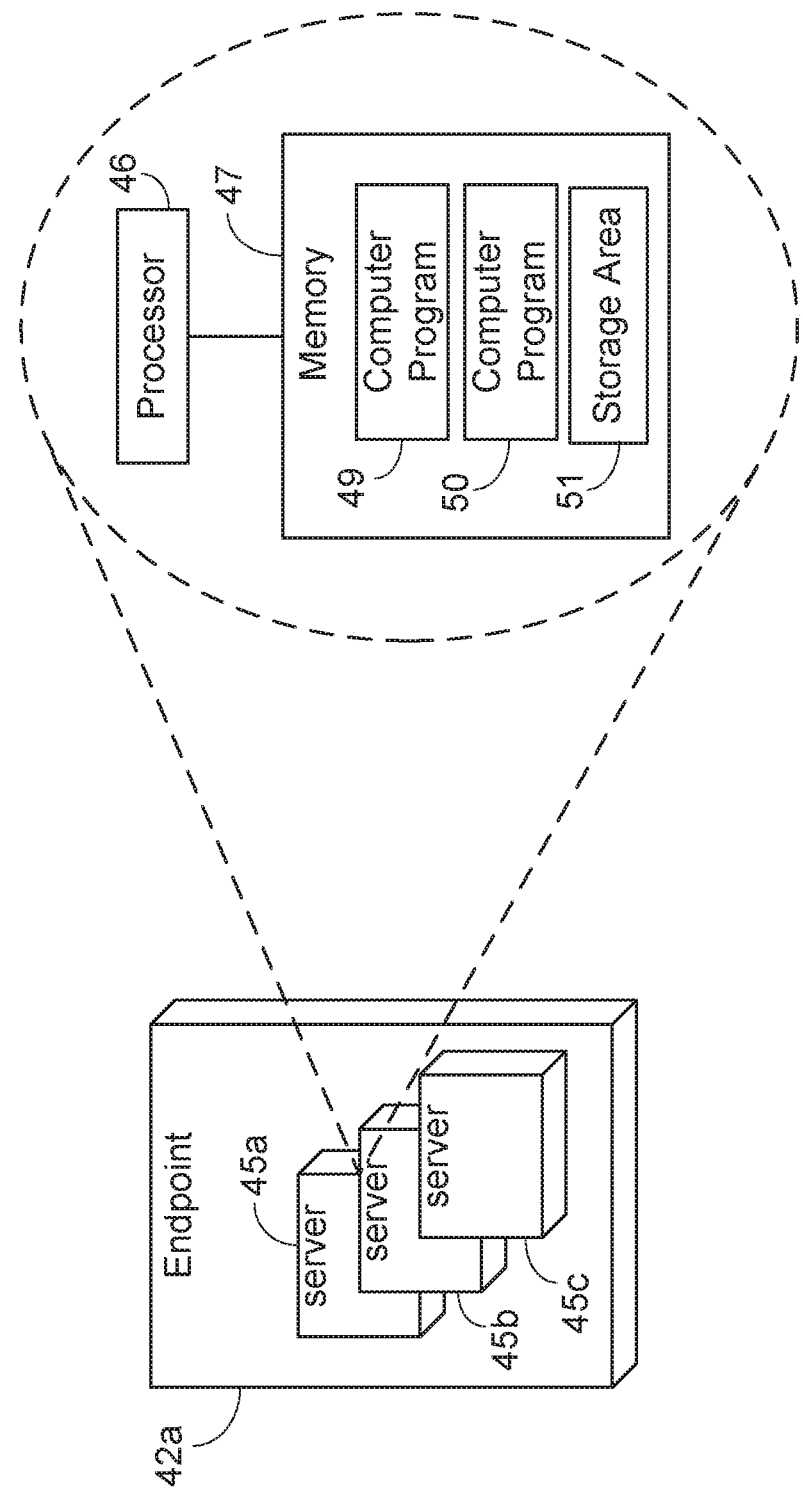
FIG. 5 is a block diagram of an endpoint device on the network of FIG. 4.
Figure 6:
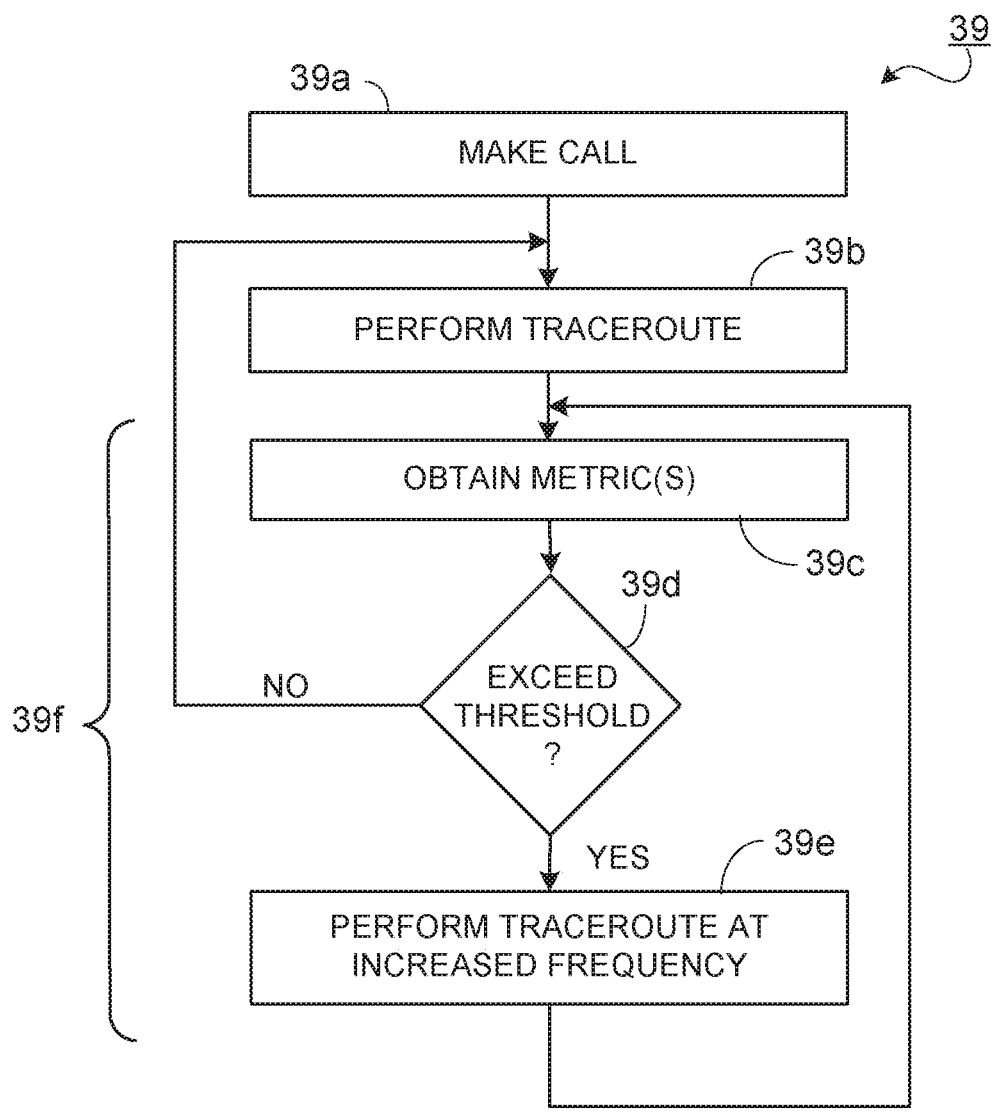
FIG. 6 is a flowchart showing a process for monitoring the quality of a telephone call transmitted over a network.

Turning to FIGS. 4 to 6, described below is a process 39 for determining QoS for calls over a network. Processes 30 and 60 (and a corresponding third party process) may use the information generated by process 39 (and stored in the central monitoring system) when assigning routes through network 10, as described above.

FIG. 4 shows a network 40, over which devices, such as telephones, communicate. Network 40 may be, e.g., a subset of network 10. The communication devices may be the same as described above with respect to network 10.

As was the ease above, network 40 can be conceptualized as a set of nodes. These nodes include endpoint devices (or simply, "endpoints") 42a to 42e and intermediary or other devices 44a to 44h for routing data, including telephone calls, between the various endpoints. Examples of intermediary devices include, but are not limited to, routers, switches, gateways, or the like. Examples of endpoints include IP carrier systems, such as those described above for Verizon® and Comcast®.

Each of endpoints 42a to 42e may be identical in structure and function, or at least have certain structure and functionality in common. This common structure and functionality is described with respect to endpoint 42a (FIG. 5). Since the other endpoints contain this structure and functionality, detailed descriptions thereof are omitted.

Endpoint 42a may include one server 45a or multiple server 45a to 45c (servers 45b and 45c are depicted using dashed lines to indicate that they are optional). Each of servers 45a to 45c may have the same, or similar, hardware and/or software configuration. In this implementation, servers 45a to 45c act together to perform the various functions described below. In other implementations, a single server may perform. all of the server functions. In the case of multiple servers, server 45a may act as a controller or "load balancer" for the remaining servers 45b and 45c. In this role, server 45a may route data, requests, and instructions between a client (e.g., a VOIP communication device) and a subordinate device, such as server 45b. Server 45a may store information locally, then route data to another device, such as device 45b. For the purposes of the following, such internal communications between server 45a and any subordinate devices will be assumed.

Server 45a may be any type of processing device that is capable of receiving and storing data, and of communicating with VoIP clients. As shown in FIG. 5, server 45a includes one or more processors 46 and memory 47 that stores computer programs that are executed by processor(s) 46. In this regard, memory 47 stores a computer program 49 for communicating with other devices using, e.g., session initiation protocol (SIP). Memory 47 also contains one or more computer programs 50 for executing process 39 described herein, and one or more storage areas 51 for use as data storage.

Referring to FIG. 6, process 39 is shown which may be performed by computer program 50 in one or more endpoints to monitor the quality (QoS) of one or more telephones calls transmitted across network 40. Process 39 will be described in the context of endpoint 42a (here, a computer, such as a server), however, process 39 may be performed by any and all endpoints or other devices on network 40. For example, process 39 may be performed by destinations 16a, 16b, sources 15a, 15b, registration server 26, and/or central monitoring system 27 (FIG. 1).

According to process 39, endpoint 42a makes (39c) a telephone call over network 40. That is, endpoint 42a receives call data from a communication device, e.g., via a telephone system such as source 15a. (FIG. 1). Endpoint 42a may then formulate a call, e.g., to another endpoint 42d, such as a server for a long distance provider. In this implementation, the call is established using SIP and data packets for the call are transferred using RTP. Real-time transfer control protocol (RTCP) is used to provide out-of-band control information for RTP. RTCP provides feedback on the QoS being provided by RTP. QoS may also be based on evaluation of the RTP packets. One feature of RTCP is that it provides for monitoring of lost data packets and jitter at the source of a call, at the destination of a call, and at one or more nodes between the source and destination. Jitter is a variation in packet transit delay, which may be caused by several factors including, but not limited to, queuing, contention and serialization effects. With respect to monitoring lost data packets, data packets are typically sequential. RTCP is able to identify lost data packets based on a break in the packet sequence.

By using RIP and RTCP collected data, faults can be associated with a local network, an inbound network, or an outbound network. Furthermore, changes in call quality may vary by time-of-day, e.g., times with greater amounts of traffic may experience lower call quality. The RTP and RTCP may be used to identify the times of day that provide lowest call quality for given network conditions.

Once the call is established, process 39 continues to perform (39b) a traceroute for the call. Initially, the traceroute is performed at a predetermined frequency, such as every five seconds. The traceroute thus establishes a baseline for the network. The baseline may be a point to which subsequent operation of the network may be compared. It is noted that a background traceroute is performed prior to establishing the call in order to keep track of (e.g., continuously analyze) the network's configuration. This traceroute may be modified, as noted above, after a call is established.

The traceroute also establishes the network topology for use in identification of command and unique paths for multiple endpoints. This may be done in order to facilitate fault location, e.g., by observing which endpoints experience a problem, which do not, and then correlating the common and unique parts of the paths through the network. For example, network paths that are unique to selected endpoints are more likely to contain a fault if the selected endpoints are experiencing problems and other endpoints (e.g., that share common network paths with the selected endpoints) are not. There may also be a correlation of data packet loss over time in a traceroute from a single endpoint, which can aid in location of the network fault.

Process 39 obtains (39c), via the traceroute, one or more metrics associated with the call. That is, in response to the ping, the device that initiated the traceroute receives information (the metrics) from the device that was "pinged". In this implementation, the metrics include, but are not limited to, amounts of jitter and packet loss between the source and destination of the call. As indicated above, RTCP provides for monitoring of lost data packets and jitter from the source of a call. The traceroute obtains this RTCP-maintained information. The traceroute also enables identification of nodes of network 40 that have failed or that are not working properly. Referring to FIG. 4, for example, process 39 may receive no information beyond node 44*c* (between endpoint 42*a* and endpoint 42*e*) in response to the traceroute. From this, process 39 may infer that one or more nodes beyond node 44*c* has either failed or is not working properly.

After process 39 obtains the metrics, process 39 performs a comparison (39*d*) of the metrics to a predetermined threshold. The individual metrics may be compared to separate corresponding thresholds or, alternatively, the metrics may be combined into a single metric and compared to a single threshold. If one or more metric(s) exceed one or more of the threshold(s), process 39 increases (39*c*) the frequency of the traceroute (e.g., from five second intervals to one second intervals), and returns to block 39*c*, where part 39*f* of process 39 is repeated until the metric(s) are below the threshold(s). The frequency is increased in order to obtain additional information from the network.

In this implementation, a threshold may correspond to an acceptable QoS, and may relate, e.g., to an acceptable amount of jitter and/or an acceptable packet loss (e.g., twenty packets lost in a five second interval). The amount of call degradation represented by the threshold may not be detectable by the human ear. Thus, routing corrections may be made, as described below, before call degradation on a route reaches an audible level.

Process 39 continues to perform traceroutes as described above during the course of the call. The information obtained via the traceroutes may be stored in endpoint 42*a*. As explained above, this information defines the QoS associated with the call, and may include the number of packets lost during the call or during a predefined period of the call, the amount of jitter during the call or during a predefined period, and information indicating problems in network 40, such as which network nodes are disabled.

In this implementation, the QoS information is obtained for multiple calls made by the same endpoint and for multiple devices on the same network 40. In some implementations, the information is obtained for every call made by each endpoint and for every endpoint on network 40. In any case, the information may be sent to a central monitoring system, from which it may be provided to a source or destination. The central monitoring system may be a designated endpoint or other device on network 40.

More specifically, the central monitoring system receives the QoS information from the various endpoints (or other devices) on network 40 and stores that information. The central monitoring system may identify routes that have the fewest number of packets lost, routes that have the least jitter, routes in which no device are inoperable or disabled, routes that have the shortest path to a destination, or some combination thereof.

In identifying routes, the central monitoring system may use information from the various endpoints to identify, with greater precision, faults on network 40. Since the central monitoring system receives information from endpoints that have used different routes through the network, the central monitoring system is able to use triangulation to identify faults on network 40. For example, the central monitoring system may receive information from device 42*d* that it does not receive traceroute information beyond node 44*c*. The central monitoring system may also receive information front device 42*c* that it is able to access endpoint 42*b*. Knowing this, and the configuration of network 40, the central monitoring system is able to ascertain that node 44*d* is not operating properly and, as such, designate routes that do not include node 44*d* in an attempt to avoid network faults. Factors other than those described above may also be taken into consideration by the central monitoring system when designating routes through network 40. For example, the central monitoring system may correlate data packet loss and jitter over the network based on a sequence of traceroutes (or pings) to determine loss over the network. The correlation may also be over time, and from a single or multiple node, in order to determine the location of a fault on the network. As explained above, the central monitoring system, however, may be implemented using peer-to-peer software, or a combination of peer-to-peer software and a centralized system. In such an implementation, the central monitoring functionality described above may be performed by the network node(s) that. an running the peer-to-peer software.

The identified routes may be distributed from the central monitoring system to sources 15*a*, 15*b* and/or destinations 16*a*, 16*b* (and also to the endpoints, if desired). Updates to these routes may be made via process 39, which may be performed on a continuous basis in order to keep the routes up-to-date. Each endpoint may route subsequent telephone calls in accordance with the route(s). For example, the subsequent telephone calls may be routed to avoid problems on network 40.

The central monitoring system may designate routes that are advantageous for each device given the device's location on network 40. Also, weights may be assigned to QoS information from different endpoints. As a result, some endpoints (e.g., predefined trusted endpoints) may have a greater effect on the routes designated by the central monitoring system than others. In like manner, a group or groups of endpoints may be given greater weight than others endpoints.

Processes 30, 39 and 60, and their various modifications described herein (hereinafter referred to as "the processes"), can be implemental, at least in part, via one or more computer program products, i.e., computer program(s) tangibly embodied in one or more information carriers, e.g., in one or more machine-readable storage media or in a propagated signal, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The processes are not limited to use with VoIP-enabled telephones or to any particular network configuration. Likewise, the processes are not limited to the specific hardware and protocols described herein.

In other implementations, the sources (e.g., 15a, 15b) and destinations (16a, 16b) may be part of the IP carrier systems (e.g., nodes of network 10). The actions associated with processes 30, 39 and/or 60 may be rearranged and/or combined. In this regard, elements of different implementations described herein may be combined to form other implementations not specifically set forth above. Other implementations not specifically described herein are also within the scope of the following claims.

What is claimed is:

1. A method for affecting routing of a communication from a first computer system, through a network, to a second computer system, the method comprising: identifying a location of a fault on a segment of the network based on (a) a determination of which of multiple communication endpoints on the network experience data transmission that is affected by the fault, and (b) correlating both common and unique segments of paths through the network to the multiple communication endpoints experiencing data transmission affected by the fault, and the remaining multiple communication endpoints; selecting a metric based on a type of the communication initiated from the first computer system, through the network, ending at the second computer system, the first computer system and the second computer system being among the multiple communication endpoints on the network; determining whether a route through the network meets the selected metric and avoids the segment of the network containing the fault; assigning an output address of the first computer system and an input address of the second computer system corresponding to the determined route through the network; and when the route is determined to no longer meet the selected metric, the method further comprises assigning a new output address of the first computer system and a new input address of the second computer system to a new route through the network, at least one of the new output address of the first computer system and the new input address of the second computer system being different from the output address of the first computer system and the input address of the second computer system.

2. The method of claim 1, wherein the multiple communication endpoints comprise carrier systems.

3. The method of claim 1, further comprising generating a route list comprising the output address of the first computer system and the input address of the second computer system, the route list comprising one or more additional output addresses of the first computer system paired with one or more additional input addresses of the second computer system.

4. The method of claim 1, wherein the selected metric comprises:
plural metrics, the plural metrics comprising an attribute of the determined route and a quality of communication, or
a bandwidth associated with the determined route.

5. The method of claim 4, wherein the attribute of the determined route comprises at least one of a quality of the determined route and a bandwidth associated with the determined route.

6. The method of claim 4, further comprising: assigning the new output address of the first computer system and the new input address of the second computer system to the determined route if there is not sufficient bandwidth associated with the determined route to accommodate the communication, at least one of the new output address of the first computer system and the new input address of the second computer system being different from the output address of the first computer system and the input address of the second computer system.

7. The method of claim 1, wherein the network comprises:
an unmanaged network, over which a predefined bandwidth is not guaranteed for communication, or
a managed network, over which a predefined bandwidth is guaranteed for communication.

8. The method of claim 7, wherein the unmanaged network comprises the Internet.

9. The method of claim 1,
wherein assigning comprises generating a route list comprising the output address of the first computer system and an input address of the second computer system; and wherein, prior to engaging in a communication over the network, the first computer system is configured to obtain the route list and to route the communication in accordance with the route list.

10. The method of claim 1, further comprising selecting the metric further based on a type of the communication being one of video content or voice content.

11. One or more non-transitory machine-readable storage media comprising instructions that are executable to affect routing of a communication from a first computer system, through a network, to a second computer system, the instructions being executable by one or more processing devices to:
identify a location of a fault on a segment of the network based on (a) a determination of which of multiple communication endpoints on the network experience data transmission that is affected by the fault, and (b) correlating both common and unique segments of paths through the network to the multiple communication endpoints experiencing data transmission affected by the fault, and to the remaining multiple communication endpoints;
select a metric based on a type of the communication initiated from the first computer system, through the network, ending at the second computer system, the first computer system and the second computer system being among the multiple communication endpoints on the network;
determine whether a route through the network meets the selected metric and avoids the segment of the network containing the fault;
assign an output address of the first computer system and an input address of the second computer system-corresponding to the determined route through the network; and when the route is determined to no longer meet the selected metric, assign a new output address of the first computer system and a new input address of the second computer system to a new route through the network, at least one of the new output address of the first computer system and the new input address of the second computer system being different from the output address of the first computer system and the input address of the second computer system.

12. The one or more non-transitory machine-readable storage media of claim 11, wherein the multiple communication endpoints comprise carrier systems.

13. The one or more non-transitory machine-readable storage media of claim 11, further comprising instructions to generate a route list comprising the output address of the first computer system and an input address of the second computer system, the route list comprising one or more additional output addresses of the first computer system paired with one or more additional input addresses of the second computer system.

14. The one or more non-transitory machine-readable storage media of claim 11, wherein the communication is sent from the new output address of the first computer system and received at the new input address of the second computer system.

15. The one or more non-transitory machine-readable storage media of claim 11, wherein the selected metric comprises:
- plural metrics, the plural metrics comprising an attribute of the determined route and a quality of communication, or
- a bandwidth associated with the determined route.

16. The one or more non-transitory machine-readable storage media of claim 15, wherein the attribute of the determined route comprises at least one of a quality of the determined route and a bandwidth associated with the determined route.

17. The one or more non-transitory machine-readable storage media of claim 16, further comprising instructions to: assign the new output address of the first computer system and the new input address of the second computer system if there is not sufficient bandwidth associated with the determined route to accommodate the communication, at least one of the new output address of the first computer system and the new input address of the second computer system being different from the output address of the first computer system and the input address of the second computer system.

18. The one or more non-transitory machine-readable storage media of claim 11, wherein the network comprises:
- an unmanaged network, over which a predefined bandwidth is not guaranteed for communication, or
- a managed network, over which a predefined bandwidth is guaranteed for communication.

19. The one or more non-transitory machine-readable storage media of claim 18, wherein the unmanaged network comprises the Internet.

20. A system to affect routing of communication over a network, comprising: a first computer system having plural output addresses;
- a second computer system having plural input addresses; and at least one of the first computer system and the second computer system being configured to:
  - (i) identify a location of a fault on a segment of the network based on (a) a determination of which of multiple communication endpoints on the network experience data transmission that is affected by the fault, and (b) correlating both common and unique segments of paths through the network to the multiple communication endpoints experiencing data transmission affected by the fault, and to the remaining multiple communication endpoints;
  - (ii) to select a metric based on a type of the communication initiated from the first computer system, through the network, ending at the second computer system, the first computer system and the second computer system being among the multiple communication endpoints on the network,
  - (iii) to determine whether a route through the network meets the selected metric and avoids the segment of the network containing the fault,
  - (iv) to assign an output address of the first computer system and an input address of the second computer system, through which addresses communication is routed, via the network, between the first computer system and the second computer system-corresponding to the determined route through the network; and
- when the route is determined to no longer meet the selected metric, to assign a new output address of the first computer system and a new input address of the second computer system to a new route through the network, at least one of the new output address of the first computer system and the new input address of the second computer system being different from the output address of the first computer system and the input address of the second computer system.

* * * * *